United States Patent Office 3,565,951
Patented Feb. 23, 1971

3,565,951
RECOVERY OF LYSINE FROM FERMENTATIVE BROTHS
Moriyoshi Ishida, Kanagawa-ken, Yoshihisa Sugita, Tokyo, and Terutsugu Hori and Kunimitsu Sato, Kanagawa-ken, Japan, assignors to Ajinomoto Co., Inc., Tokyo, Japan
No Drawing. Filed Mar. 20, 1967, Ser. No. 624,164
Claims priority, application Japan, Mar. 23, 1966, 41/17,829
Int. Cl. C07c 99/12
U.S. Cl. 260—527                    5 Claims

ABSTRACT OF THE DISCLOSURE

Pure lysine is recovered in the form of its monohydrochloride from fermentation broths also containing neutral amino acids and inorganic cations by passing the broth at about pH 2.0 over a strongly acidic cation exchange resin of the $NH_4^+$ type, eluting the lysine with ammonium hydroxide solution, and crystallizing the lysine as an acid salt from the partly evaporated and acidified eluate. The resin is regenerated by the eluent and ready to return to the process after elution.

BACKGROUND OF THE INVENTION

This invention relates to the recovery of lysine from its aqueous solutions contaminated with inorganic cations and neutral amino acids, and particularly to the recovery of lysine from fermentation broths in which the lysine was formed by the action of microbes.

Lysine is commonly produced by microbial fermentation, and the broth contains not only lysine but also inorganic cations, mainly those of calcium, potassium, and ammonium, and other amino acids. Broths containing molasses as a carbon source are particularly rich in calcium. Ion exchange resins were employed in the recovery of lysine heretofore in two methods. In one method, strongly acidic cation exchange ions of the $H^+$-type were contacted with the broth. They absorb not only lysine but also the afore-mentioned inorganic ions, and release the ions together with the lysine upon elution with ammonium hydroxide solution so that the lysine recovered from the eluate is impure. The resin must be regenerated after each run, and the runs are short because the capacity of the resin is taken up to a significant extent by the contaminants.

Attempts have also been made to contact the broth, whose pH is normally near 7.0, with strongly acidic cation exchange resins of the $NH_4^+$-type. This resin, however also absorbs the inorganic ions with the lysine from the neutral liquid and yields a mixture of lysine with all the inorganic ions upon elution. Moreover, the resin must be regenerated first with acid and thereafter with ammonium hydroxide for effective removal of the inorganic ions taken up from the broth.

Neither ion exchange method has been satisfactory or even moderately successful on an industrial scale.

SUMMARY OF THE INVENTION

It has now been found that lysine is preferentially absorbed from the afore-described fermentation broths at pH values of 0.5 to 3.0 by strongly acidic cation exchange resins of the $NH_4^+$ type and largely displaces the inorganic cations from the resin if they are present. Elution of the lysine with ammonium hydroxide is sufficient to regenerate the resin fully. No separate regeneration treatment is required. Lysine is effectively separated from accompanying neutral amino acids by this procedure.

The most desirable results are achieved at pH 1 to 2, as is apparent from Table 1. The table is based on test runs in which 500 ml. batches of a 2.5% solution of lysine monohydrochloride were adjusted to the listed pH values and shaken for 5 hours at ambient temperature with 20 ml. Diaion SK-1B, a strongly acidic cation exchange resin of the $NH_4^+$ type. The resin was then separated from the liquid, and the lysine content of the latter was determined by Warburg's manometric method to calculate the capacity of the resin for absorbing lysine. A second series of tests was run with solutions which contained ammonium ions (as ammonium sulfate) in a mole ratio of 3:1 relative to the lysine to approximate actual conditions in a fermentation broth.

| pH | Lysine capacity of resin (grams lysine per liter resin) | |
|---|---|---|
| | Without $NH_4$ | With $NH_4$ |
| 0.5 | 152 | 98 |
| 1.0 | 186 | 122 |
| 2.0 | 194 | 128 |
| 3.0 | 258 | 89 |
| 4.0 | 288 | 51 |
| 6.0 | 285 | 44 |

As is evident from the table, the lysine capacity of the resin in the presence of ammonium ions drops sharply above pH 3. It has been found that not only ammonium but also potassium and calcium discplace the lysine in the higher pH range, while relatively little of the inorganic ions is absorbed at pH 0.5–3.

This fact was further established by tests in which actual fermentation broths were employed. The several batches of broth were acidified to pH 2.0 with hydrochloric acid and thereafter contained the amounts of lysine hydrochloride, calcium ions, and ammonium ions listed in the following Table 2. Each acidified broth was passed consecutively at 400 ml./hour over two columns packed with 200 ml. Diaion SK–1B of the $NH_4^+$-type that had been used in previous runs and regenerated.

After each run, the lysine was eluted from the first column with 2 N ammonium hydroxide solution, the resin of this column was washed with water until neutral, and the column was arranged behind the previously last column for the next run. The amount of lysine and calcium retained on the first column was determined after each run. The retained lysine is listed in Table 2 in grams per liter of resin whereas the retained calcium is listed in percent of resin capacity, the capacity of the resin for absorbing calcium in the absence of lysine having been determined separately.

TABLE 2

| Run No. | Fermentation broths | | | Retained on resin | |
|---|---|---|---|---|---|
| | Lysine-HCl, g./dl. | $Ca^{++}$, g./dl. | Mole ratio $NH_4^+$: lys.HCl | Lysine.HCl, g./l. | Calcium, percent |
| 1 | 2.90 | 0.070 | 2.09 | 99 | 2.3 |
| 2 | 2.69 | 0.073 | 2.13 | 115 | 2.3 |
| 3 | 2.71 | 0.072 | 2.31 | 118 | 2.2 |
| 4 | 2.74 | 0.074 | 2.12 | 114 | 2.8 |
| 5 | 2.46 | 0.156 | 3.19 | 111 | 8.7 |
| 6 | 2.65 | 0.143 | 2.18 | 110 | 9.9 |
| 7 | 2.88 | 0.143 | 2.22 | 115 | 9.6 |
| 8 | 2.34 | 0.097 | 2.28 | 113 | 3.4 |
| 9 | 2.66 | 0.097 | 1.97 | 121 | 3.0 |

As is evident from Table 2, lysine is absorbed from the broth at pH 2 while most of the calcium passes through the column, and calcium and other inorganic ions originally retained are displaced by lysine so that the resin retains only an amount of these inorganic ions which is a very small fraction of its capacity. When the lysine is eluted with ammonium hydroxide solution, the resin is immediately ready to return to the process. There is no separate regeneration step.

The afore-described favorable mode of operation is limited to a pH range of 0.5 to 3 in the treated liquid. This is evident from Table 3 which shows the composition of broths employed in six absorption runs at pH 6.0 on the two columns described above. The amounts of lysine hydrochloride, calcium, potassium, and ammonium in the broths are shown for the first and second runs and for the sixth run, the composition of the broth in the third to fifth runs being closely similar. The lysine, calcium, and potassium retained on the first column after the first, second, and sixth runs are also listed in the manner of Table 2. The procedure employed was otherwise the same as described with reference to Table 2.

TABLE 3

| | Fermentation broths | | | | Retained on resin | | |
|---|---|---|---|---|---|---|---|
| Run No. | Lysine-HCl, g./dl. | Ca++, g./dl. | K+, g./dl. | Mole ratio, NH₄:lys. HCl | Lysine-HCl, g./l. | Ca, percent | K, percent |
| 1 | 2.96 | 0.171 | 0.560 | 1.37 | 33.6 | 26.2 | 17.8 |
| 2 | 2.96 | 0.171 | 0.560 | 1.37 | 30.1 | 30.7 | 17.7 |
| 6 | 2.87 | 1.169 | 0.552 | 1.35 | 17.2 | 62.1 | 17.9 |

It is evident from Table 3 that, at pH 6.0, lysine is gradually displaced from the resin by calcium and potassium, and that the absorption of the inorganic ions cuts sharply into the lysine absorption even at the first run. The inorganic cations are not displaced at a practical rate if ammonium hydroxide solution is passed over the columns to elute the lysine.

Other amino acids present in the broth together with the lysine are absorbed by strongly acidic cation exchange resins of the $NH_4^+$ type at a much lower rate than lysine if the broth is acidified to the pH range of 0.5–3.0. Table 4 lists results of tests performed to determine the lysine and valine capacity of Diaion SK–1B in the manner more fully described with reference to Table 1. Solutions containing 2.5 g./dl. lysine monohydrochloride and various concentrations of valine were employed in a first series of tests. In a second series, the solutions additionally contained ammonium ions as in Table 1. In both series, the pH was 1.5.

TABLE 4

| Weight ratio valine:lysine HCl | Resin capacity for lysine and valine (g./l.) | | | |
|---|---|---|---|---|
| | Without NH₄ | | With NH₄ | |
| | Lys. HCl | Valine | Lys. HCl | Valine |
| 0.12 | 169 | 10 | 122 | 7 |
| 0.25 | 165 | 16 | 117 | 13 |
| 0.37 | 155 | 23 | 115 | 15 |
| 0.50 | 153 | 23 | 120 | 15 |
| 0.63 | 152 | 22 | 115 | 17 |
| 0.77 | 148 | 28 | 105 | 22 |

As Table 4 shows, the absorption of lysine at pH 1.5 is not impaired by the presence of relatively high concentrations of valine while the absorption of the latter is held to a constant small value by the lysine present, regardless of an increase in the valine concentration above a lower limiting value although a pH of 1.5 is most favorable to valine absorption. While ammonium ions present in the solution reduce the absorption capacity of the resin for lysine, they do not affect the ratio of lysine and valine in the absorbed material.

The direction of flow in an upright resin column has no effect on the results obtained. The exact chemical nature of the ion exchange resin is not relevant to the success of the method, and the following resins, identified by their trade names or trademarks, have been used with equal success when in the $NH_4^+$ form:

Diaion SK–1     Dowex 50
Amberlite IR–120     Duolite C–25
Amberlite IR 122     Duolite C–20
Amberlite XE–100     Permutit Q Recovery of the absorbed lysine from the resin columns may follow conventional procedures. It is preferred to elute the lysine by means of aqueous ammonium hydroxide solution, partly to evaporate the eluate until the ammonia is driven off, to acidify the concentrate, and further to evaporate it until an addition salt of lysine with the acid employed for acidification can be crystallized upon cooling. Hydrochloric acid is the preferred acidifying agent but other acids can obviously be employed, so that the lysine values are recovered from the eluate in the form of salts other than the hydrochloride.

DESCRIPTION OF PREFERRED EMBODIMENTS

The following examples further illustrate the invention but it will be understood that the invention is not limited thereto.

EXAMPLE 1

Enough concentrated hydrochloric acid was added to 4.3 liters of a fermentation broth containing 1.75 g./dl. lysine, 0.21 g./dl. calcium in ionized form, and minor amounts of homoserine, valine, and alanine to lower the pH to 2.0. The acidified broth was passed over a column of one liter Diaion SK–1B, a strongly acidic cation exchange ion of the $NH_4^+$ type, at a rate of approximately 15 ml. per minute, and the column was then washed with two liters water at the same rate.

96.5 percent of the lysine originally present in the broth were absorbed by the resin, but only 43.2% of the calcium. The column was washed back with water to remove bacterial cells, and the absorbed lysine was then eluted with 1.2 liters 2 N aqueous ammonium hydroxide at a rate of a 8 ml. per minute. The eluate was evaporated to 300 ml. in a vacuum. The concentrate did not contain detectable amounts of calcium. 41 ml. concentrated hydrochloric acid were added, and vacuum evaporation was resumed to an ultimate volume of 135 ml. Upon standing overnight, crystalline lysine monohydrochloride dihydrate precipitated. It was separated from the mother liquor by filtration and dried. It weighed 69.8 g. and had a purity of 98.4%. No other amino acids could be detected in the crystalline material by paper chromatography.

EXAMPLE 2

A fermentation broth having a volume of 8.3 liters and containing 2.22 g./dl. lysine, 0.17 g./dl. $Ca^{++}$, 0.49 g./dl. $K^+$ and minor amounts of homoserine, valine, and alanine was adjusted to pH 2.0 with hydrochloric acid.

A 1.3 liter batch of the acidified broth was passed at a rate of 7 ml. per minute over two columns arranged in series and packed each with 200 ml. $NH_4$-type Duolite C–20, a strongly acidic cation exchange resin, which were thereafter rinsed with water as in Example 1.

The column which had first received the broth was back-washed to remove cells and eluted with 240 ml. 2 N ammonium hydroxide solution at a rate of 3.3 ml. per minute, and the eluate was stripped of ammonia by evaporation to approximately 100 ml., and temporarily stored in a refrigerator. The eluted column was rinsed with water until the effluent was practically neutral, and was then arranged in series behind the other column.

This cycle of operations was repeated nine times with broth batches of 800 ml. each. The amounts of lysine, calcium, and potassium absorbed on the columns varied from 98.5%, 42.3%, and 36.1%, respectively, in the first cycle to 97.3%, 1.2%, and 0.8% in the second cycle, and 96.9%, 0.1% and 0.4% in the last cycle, the first figure in each cycle indicating the amount of lysine absorbed from the batch, the second figure the calcium, and the third the potassium.

The collected eluates were combined, mixed with 105 ml. concentrated hydrochloric acid, evaporated to 340 ml., and then cooled to induce crystallization of lysine monohydrochloride dihydrate. The crystals, when recovered and dried, weighed 175 g. and their purity was 98.1%. No other amino acid was present in them in detectable amounts.

EXAMPLE 3

A fermentation broth containing 1.6 g./dl. lysine, 0.38 g./dl. $Ca^{++}$, 0.6 g./dl. $K^+$, and minor amounts of homoserine, valine, alanine, and isoleucine, and having a total volume of 31,500 liters was adjusted to pH 2.0 and passed at 2500 liters per hour over a battery of three columns arranged in series and packed with 1,000 liters $NH_4$-type Amberlite I-120, a strongly acidic polystyrene sulfonic acid resin. The flow of broth was stopped when lysine appeared in the effluent liquid, the first column in the battery was removed, and a fresh column was added at the end of the battery, whereupon flow was resumed.

The removed column was eluted with 1,200 liters 2 N ammonium hydroxide, washed until about neutral, and back-washed to remove cells. It was then ready to take the last position in the battery when lysine again became detectable in the effluent, and the then first column was removed. This procedure was repeated through a total of seven cycles.

The combined eluates contained practically the entire lysine originally present in the broth and only little of the inorganic cations. The liquid was partly evaporated, whereby it was stripped of ammonia, mixed with 30.5 liters 35% hydrochloric acid, further evaporated, and cooled to induce crystallization of lysine monochlorohydrate dihydrate. The recovered crystals weighed 56.5 kg. when dry and were free of other amino acids in amounts detectable by paper chromatography.

While the invention has been described with particular reference to specific embodiments, it is to be understood that it is not limited thereto, but is to be construed broadly, and restricted solely by the scope of the appended claims.

What is claimed is:

1. In a method of recovering lysine from a fermentation broth containing said lysine together with inorganic cations and other amino acids by passing the broth over a cation exchange resin, eluting the absorbed lysine from the resin, and recovering the lysine values from the eluate, the improvement which comprises:
   (a) adjusting said broth to a pH value between 0.5 and 3.0 prior to said passing thereof over said cation exchange resin,
   (b) the resin being a strongly acidic cation exchange resin of the $NH_4^+$ type; and
   (c) eluting said lysine from said resin by means of aqueous ammonium hydroxide solution, whereby the resin is regenerated.

2. In a method as set forth in claim 1, said pH value being between 1 and 2.

3. In a method as set forth in claim 1, said inorganic cations being mainly ions of calcium.

4. In a method as set forth in claim 1, said resin constituting a plurality of columns, said broth being passed over said columns in series, the column which is the first member of said series being eluted by means of said ammonium hydroxide solution when lysine appears in the effluent from the last column of said series, and the eluted column being returned to the series as the last member.

5. In a method as set forth in claim 1, recovering lysine in solid form from the eluate obtained by eluting said lysine from said resin.

References Cited
UNITED STATES PATENTS

| | | | |
|---|---|---|---|
| 2,586,295 | 2/1952 | Brown et al. | 260—527X |
| 2,590,209 | 3/1952 | Roberts | 260—529 |
| 2,785,180 | 3/1957 | Julsingha | 260—326.3 |

JAMES A. PATTEN, Primary Examiner